United States Patent [19]
Kugimiya et al.

[11] Patent Number: 5,350,628
[45] Date of Patent: * Sep. 27, 1994

[54] MAGNETIC SINTERED COMPOSITE MATERIAL

[75] Inventors: Koichi Kugimiya; Yasuhiro Sugaya; Osamu Inoue; Ken Hirota; Mitsuo Satomi, all of Osaka, Japan

[73] Assignee: Matsushita Electric Industrial Company, Inc., Osaka, Japan

[*] Notice: The portion of the term of this patent subsequent to Nov. 19, 2009 has been disclaimed.

[21] Appl. No.: 978,564

[22] Filed: Nov. 19, 1992

Related U.S. Application Data

[62] Division of Ser. No. 535,082, Jun. 8, 1990, Pat. No. 5,238,507.

[30] Foreign Application Priority Data

| Jun. 9, 1989 | [JP] | Japan | 1-47906 |
| Jul. 19, 1989 | [JP] | Japan | 1-186423 |
| Oct. 26, 1989 | [JP] | Japan | 1-280553 |
| Nov. 6, 1989 | [JP] | Japan | 1-288357 |
| Mar. 14, 1990 | [JP] | Japan | 2-63154 |

[51] Int. Cl.$^5$ .......................... G11B 5/00; H01F 1/00
[52] U.S. Cl. .................................. 428/307.3; 428/403; 428/693; 428/698; 428/900; 148/307; 148/310; 75/232; 75/233; 75/234; 75/235; 75/244; 335/302; 336/110; 360/110; 360/125
[58] Field of Search ............... 428/402, 403, 404, 693, 428/698, 900, 307.3; 148/307, 310; 335/302; 75/232, 233, 234, 235; 360/110, 125; 336/110

[56] References Cited

U.S. PATENT DOCUMENTS

| 3,255,052 | 6/1966 | Opitz | 148/105 |
| 3,739,445 | 6/1973 | Gabriel et al. | 148/284 |
| 3,814,598 | 6/1974 | Gabriel et al. | 75/232 |
| 3,892,600 | 7/1975 | Smeggil et al. | 148/103 |
| 3,933,536 | 1/1976 | Doser et al. | 148/105 |
| 3,948,690 | 4/1976 | Paulik et al. | 148/105 |
| 4,101,348 | 7/1978 | Berchtold | 148/105 |
| 4,133,677 | 1/1979 | Matsui et al. | 148/105 |
| 4,177,089 | 12/1979 | Bankson | 148/105 |
| 4,323,395 | 4/1982 | Li | 419/35 |
| 4,337,087 | 6/1982 | Esashi et al. | 420/78 |
| 4,414,271 | 11/1983 | Kitamoto et al. | 428/328 |
| 4,431,604 | 2/1984 | Sata et al. | 419/23 |
| 4,496,626 | 1/1985 | Kasuga et al. | 428/336 |
| 4,518,674 | 5/1985 | Watanabe et al. | 148/105 |
| 4,543,208 | 9/1985 | Horie et al. | 148/105 |
| 4,601,753 | 7/1986 | Soileau et al. | 148/105 |
| 5,238,507 | 8/1993 | Kugimiya et al. | 148/307 |

FOREIGN PATENT DOCUMENTS

| 0088992 | 9/1983 | European Pat. Off. |
| 0158338 | 10/1985 | European Pat. Off. |
| 3603061 | 9/1986 | Fed. Rep. of Germany |
| 55-156029 | 12/1980 | Japan |
| 59-182972 | 10/1984 | Japan |
| 60-152656 | 8/1985 | Japan |
| 60-261031 | 12/1985 | Japan |

*Primary Examiner*—Stevan A. Resan
*Attorney, Agent, or Firm*—Panitch Schwarze Jacobs & Nadel

[57] ABSTRACT

A magnetic material is provided which includes a discrete phase including grains made of a first substance which comprises a magnetic metal; and a continuous phase including a thin coating film made of a second substance which comprises a dielectric or insulating substance. The thin coating film is formed on the surface of the grains and has a mean thickness smaller than the mean particle size of the grains. The grains are separated substantially from each other by the thin coating film.

15 Claims, 7 Drawing Sheets

MAGNETIC SINTERED COMPOSITE MATERIAL

CROSS-REFERENCE TO RELATED APPLICATION

This application is a division of U.S. patent application Ser. No. 07/535,082, filed Jun. 8, 1990 now U.S. Pat. No. 5,238,507.

BACKGROUND OF THE INVENTION

1. Field of the Invention

The present invention relates to a magnetic material which is suitable for use in magnetic cores for electronic equipment such as transformer cores or magnetic heads, as well as permanent magnets.

2. Description of the Prior Art

In cases where high magnetic flux density is required, magnetic metals are used as magnetic materials for electronic components, electronic equipment and other products. However, owing to large eddy current losses, magnetic metals cannot be used in the high frequency regions, and therefore, in place of the magnetic metals that is a low electrical resistance material, high electrical resistance ferrites are used.

The aforementioned ferrites are metal oxides having magnetic properties with electrical resistivities more then 10,000 times greater than those of magnetic metals, and are therefore vastly superior to magnetic metals insofar as their eddy current losses are far lower. However, a shortcoming of ferrites consists in the fact that their saturation magnetization flux density is about ½ or less than that of magnetic metals, which renders ferrites unsuitable for use in electronic components or equipment requiring particularly high saturation magnetization flux density.

Certain composites of magnetic metals and electrical insulators have been developed as magnetic materials with high electrical resistivity and low eddy current losses even in high frequency regions. Such composites are prepared, for example, from a magnetic metal powder and a ceramic powder by mixing, molding and sintering. However, as shown in FIG. 9, the composites so obtained comprise magnetic metal granules 101 dispersed in an insulating phase 102, and the said granules are mutually separated by distances varying from several microns to several tens of microns. Therefore, the magnetic flux penetrating the interior of this composite material is blocked by the insulating substance, and consequently the magnetic permeability is markedly reduced. Thus, conventional composites of magnetic metals and insulators cannot possess characteristics other than those merely representing averages of the corresponding properties of the constituent substances. Consequently, if the proportion of the insulating substance is increased in order to obtain high electrical resistivity, then the magnetic flux density is reduced. This makes it impossible to attain the high magnetic flux density which is obtainable when only magnetic metals are used.

In addition to the aforementioned dispersed type of magnetic material, for example, laminated materials composed of alternating thin layers of metal and a dielectric substance are also known. However, processes for manufacturing this type of magnetic material are complex and therefore entail high costs. Moreover, the stress applied in the lamination process gives rise to plastic deformation, thereby disrupting the thin laminar structure, which may adversely affect the desired magnetic characteristics of the material. These shortcomings indicate the need for magnetic materials which, in bulk form, possesses performance characteristics equivalent to those of such laminated materials.

SUMMARY OF THE INVENTION

The magnetic material of this invention, which overcomes the above-discussed and numerous other disadvantages and deficiencies of the prior art, comprises a discrete phase including grains made of a first substance which comprises a magnetic metal; and a continuous phase including a thin coating film made of a second substance which comprises a dielectric or insulating substance, the thin coating film being formed on the surface of the grains and having a mean thickness smaller than the mean particle size of the grains, wherein the grains are separated substantially from each other by the thin coating film.

In a preferred embodiment, the abovementioned magnetic material has a porosity of 5% or less, and more preferably 0.5% or less.

In a preferred embodiment, the abovementioned grains made of the first substance have a platelet shape.

In a preferred embodiment, the abovementioned grains made of the first substance have a needle-like shape.

In a more preferred embodiment, the abovementioned magnetic material has a porosity of 0.1% or less.

In a more preferred embodiment, the abovementioned magnetic material has a microstructure in which the grains made of the first substance are oriented.

In a more preferred embodiment, the abovementioned platelet grains have an axis of easy magnetization along their major axes.

In a preferred embodiment, the abovementioned first substance contains at least one of iron and cobalt, the grains made of the first substance have a mean particle size ensuring the formation of a single magnetic domain structure, and the axes of easy magnetization of the grains coincide with each other.

The magnetic head of this invention, which overcomes the above-discussed and numerous other disadvantages and deficiencies of the prior art, comprises a magnetic core which is made of the abovementioned magnetic material, wherein the grains oriented in the magnetic core have their flat surface perpendicular to a running direction of magnetic media.

In a preferred embodiment, the platelet grains have an axis of easy magnetization along their major axes.

Thus, the invention described herein makes possible the objectives of:

(1) providing a magnetic material with high saturation magnetization flux density and high magnetic permeability even in the high frequency regions, and possessing electrically insulating characteristics, (2) providing a magnetic material which, in addition to the aforementioned properties, also displays excellent wear resistance and mechanical strength, (3) providing a magnetic material as indicated above, which are suitable for wide applications as materials for magnetic heads, magnetic cores for transformers and permanent magnets, (4) providing a magnetic material as indicated above, which are of bulk form, without unduly complex material structures, and can therefore be produced in a simple manner, and (5) providing a magnetic head employing the aforementioned magnetic materials.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
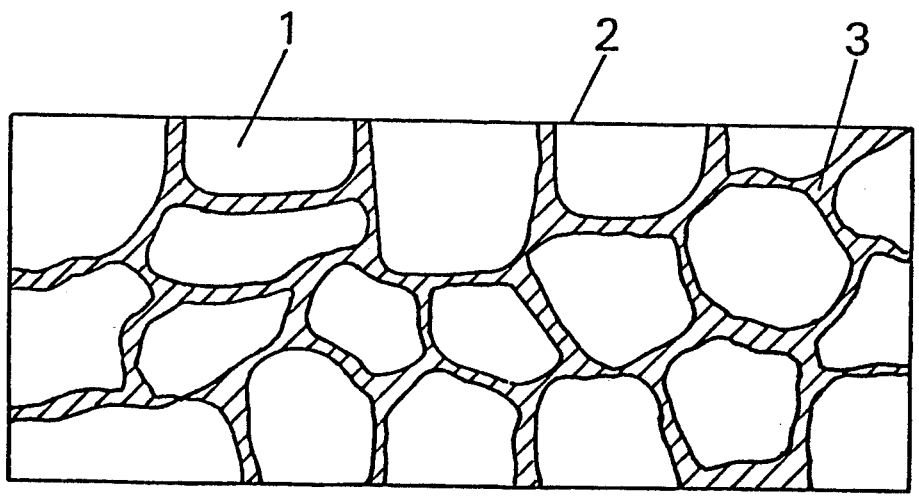
FIGS. 1, 2, 3, 4 and 5 are enlarged partial sectional views of the magnetic materials of the present invention.

As shown in FIG. 1, a magnetic material of this invention comprises a discrete phase including grains 1 made of a first substance which comprises a magnetic metal; and a continuous phase 2 including a thin coating film made of a second substance which comprises a dielectric or insulating substance, said thin coating film being formed on the surface of said grains and having a mean thickness smaller than the mean particle size of said grains. The above-mentioned grains are separated substantially from each other by the thin coating film.

Magnetic metals applicable for use as the aforementioned first substance include iron, nickel, cobalt, and alloys containing at least one of these elements. Among the appropriate alloys which can be used are Fe-Al, Fe-Si, Fe-Ni, Fe-Al-Si, Mo-Ni-Fe, Fe-Si-Al-Ni, and Si-Al-Fe-Co alloys. Dielectric or insulating substances applicable for use as the aforementioned second substance include aluminum oxide, aluminum nitride, silicon dioxide, magnesium oxide, manganese-zinc ferrites and nickel-zinc ferrites.

The production of the magnetic materials comprises preparing coated grains by forming a thin coating film of the second substance on the surfaces of grains made of the first substance; compacting these coated grains into a green body; and densifying the green body. Any of the well known methods can be used to form the thin coating film made of the second substance. For example, there may be employed a method of allowing grains made of the first substance to come into contact with an active gas, whereby the active gas reacts with the first substance on the surfaces of the grains, thus forming a layer of a substance different from the original first substance on the grain surfaces; or a method using a sputtering procedure to form a layer of the second substance on the surfaces of grains made of the first substance; or a method using a mechanical alloying process to deposit a layer of the second substance on the grain surfaces. The layer of the second substance should have a mean thickness smaller than the mean particle size of the grains made of the first substance; the appropriate sizes of the grains and thin coating film will vary according to the particular purpose and type of composite material, but ordinarily the range of mean particle sizes is 0.1–100 $\mu$m, while the mean thickness of the thin coating film is 5–50 nm.

Specific examples of the formation of the thin coating film include the formation of metal oxide films on the surfaces of metal grains by oxidation treatment, as well as the deposition onto the surfaces of metal grains of some different metal by sputtering, etc.

Next, the coated grains prepared in this manner are compacted into a green body which is then subjected to a densification process, thereby obtaining the magnetic material of the present invention. In general, densification can be achieved by high-temperature and/or high-pressure treatment. Ordinarily, densification is accomplished by treatment at a temperature of 300° C. or higher under a pressure of 100 kg/cm$^2$ or higher.

In the step of densification, a portion of the thin coating films on the grains may in some cases be broken by the operations of compression, etc., thereby exposing the grain surfaces made of the first substance. Therefore, densification is ordinarily performed in such a manner that a thin coating film is again formed by the second substance or some third substance. For example, if the densification is performed in an atmosphere of an active gas, the first substance on the exposed surfaces reacts with the active gas, thereby forming an additional thin coating film. As the active gas, oxygen gas, nitrogen gas, or the mixtures thereof, for example, may be used.

The magnetic materials formed in this manner are, for example, shown in FIG. 1, wherein the grains 1 composed of the first substance are dispersed in a continuous phase 2 composed of thin films of the second substance. This type of magnetic material possesses a synergistic combination of the properties of the magnetic metal which is the first substance and the dielectric or insulator which is the second substance. The proportion of the magnetic metal (i.e., first substance) in the present type of magnetic material is high, and therefore attainment of high magnetic flux density can be obtained. Furthermore, because the electrical resistance is high, eddy current losses are small and magnetic permeability is high even in the high frequency regions (e.g., 2 MHz or higher). Moreover, since the aforementioned magnetic metal granules are separated by a dielectric or insulating phase, the surface of the magnetic material possesses electrically insulating characteristics. Furthermore, in a cross-section of this type of magnetic material, the area occupied by triangular regions (i.e., regions bounded by three or more grains) 3 is small as compared with conventional types of magnetic materials, and therefore the wear resistance of the present type of magnetic material is high. The porosity of the magnetic materials of the present invention should ordinarily be 5% or less (i.e., the density thereof being 95% or more), and preferably 3% or less. For applications to devices such as magnetic heads, the porosity should preferably be about 0.5%, or still more preferably about 0.1%. As the porosity is 5% or less, the existing pores will be closed, and the interior of the magnetic material structure will not communicate with the exterior. Moreover, the pores in the magnetic material will not communicate with each other. Therefore, the magnetic material will exhibit high mechanical strength and wear resistance as well as superior weather and chemical resistance.

Figure 2:
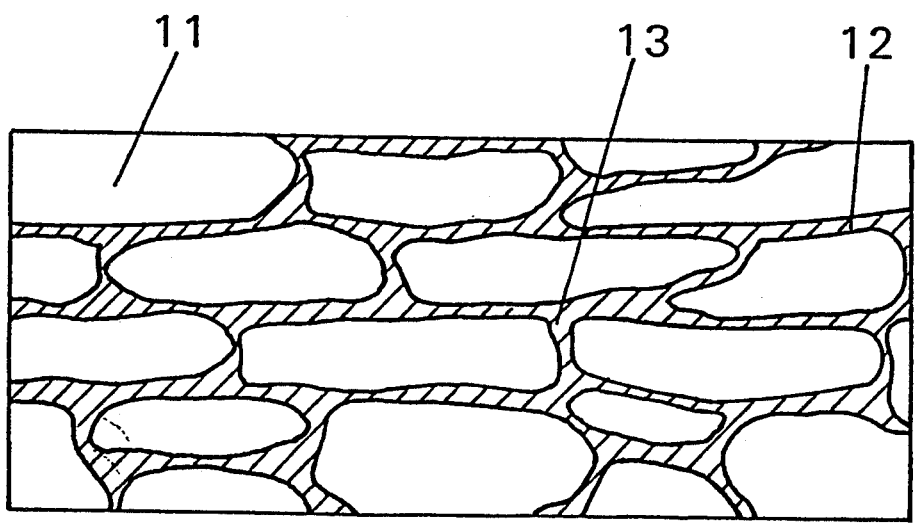

By the, application of unidirectional compression or multidirectional compression with different forces along different directions in the densification process used in the manufacture of the aforementioned magnetic material, magnetic materials with the morphology shown in FIG. 2 are obtained. In the magnetic material, platelet or platelet grains 11, with the forms of disks, oblong disks, ellipsoids of revolution or needles, are separated by a continuous phase 12 of the second substance. Such magnetic materials can also be prepared by using platelet or needle-like grains ab initio. This type of magnetic material is characterized by high hardness in the longitudinal direction of the granules and excellent wear resistance.

Figure 3:
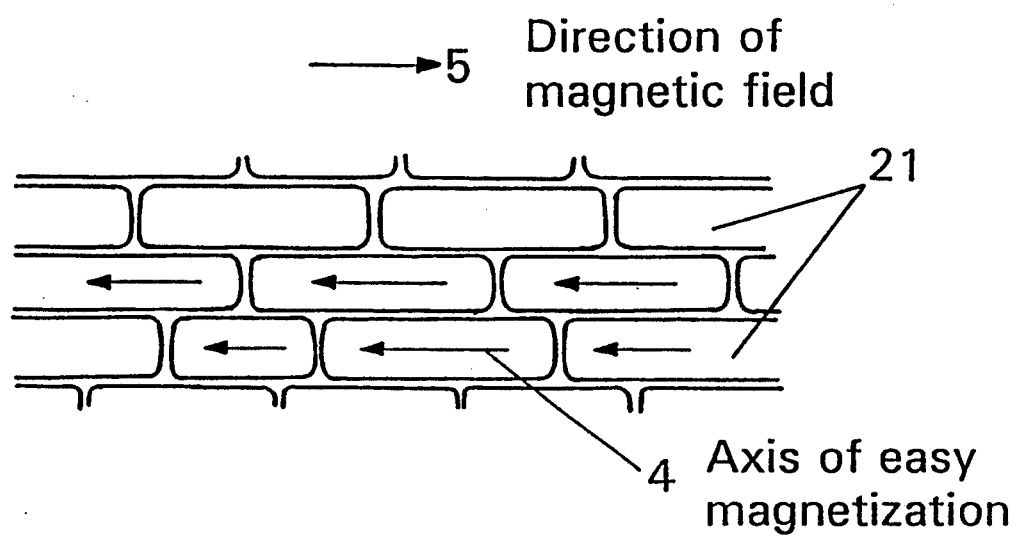

This type of magnetic material can be prepared in the form shown in FIG. 3, wherein platelet grains 21 possessing an axis of easy magnetization 4 are aligned so that their flat surfaces and longitudinal axes are oriented along a specified direction. Such magnetic materials are magnetically anisotropic. The magnetic permeability of such magnetic materials in the direction perpendicular to the flat surfaces (i.e., hard direction of magnetization) of the platelet grains 21 assumes a high value, exceeding the Snoeks' limit. The length ratio of the short axis (thickness) to the long axis (major axis) of these platelet grains should be from about ⅓ to 1/10, and the desirable length of the short axis (thickness) is 3–5 μm. If the aforementioned length ratio exceeds ⅓, then magnetic anisotropy is difficult to obtain, and therefore very high magnetic permeabilities are difficult to realize. Conversely, if this ratio is less than 1/10, then great care is necessary since the platelet grains are easily broken during the densifying process. When platelet grains are in a shape of oblong disks, the long axis should preferably be 5 to 10 times as large as the thickness, and the short axis is 3 to 5 times as large as the thickness.

Other methods of introducing magnetic anisotropy into magnetic metals include the addition of elements such as cobalt to Fe-Si-Al or other appropriate alloys, the formation of cobalt ferrites on the granule surfaces of a magnetic metal powder, varying the proportions of metallic components within the platelet grains of a magnetic metal powder so as to impart a composition gradient in the longitudinal direction of the granules, etc. As magnetic metals, Fe-Si-Al-Ni alloys are particularly suitable for the formation of the aforementioned platelet grains. For example, if a magnetic material containing platelet grains is to be prepared using spherical granules, then these granules are easily flattened by plastic deformation if this type of material is used.

Figure 4:
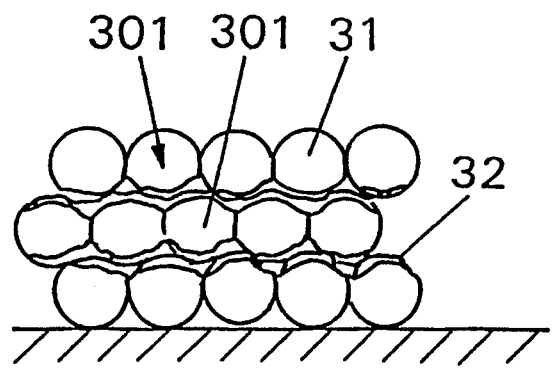
Figure 5:
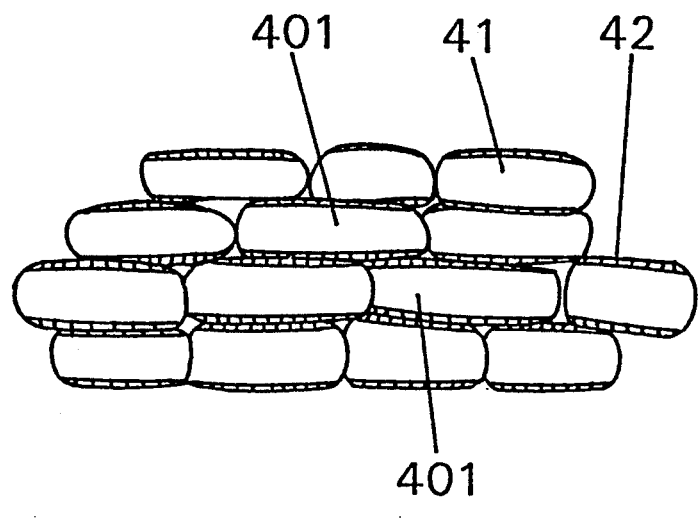

Other forms of magnetic material of the present invention include those shown in FIGS. 4 and 5. The magnetic material shown in the FIGS. 4 or 5 comprises multiple layers 301 or 401 made of grains 31 or 41 composed of the first substance, that are separated by thin film layers 32 or 42 made of the second substance. Grains 31 or 41 situated within the same layer are in mutual contact. In this type of structure, the electrical resistance in a prescribed direction (i.e., the direction perpendicular to the planes of the thin films) is high, while the electrical resistance in the direction of contact between adjoining grains is extremely low. Consequently, if the direction of contact between the grains is aligned in parallel with a flux direction in a magnetic circuit, then the flux in this direction is not affected by the thin films (insulating layers), and therefore the permeability is high. In the case of magnetic materials with platelet grains as shown in FIG. 5, still greater magnetic permeability can be attained if the direction of the flux is aligned with the longitudinal direction of the granules.

Figure 6A:
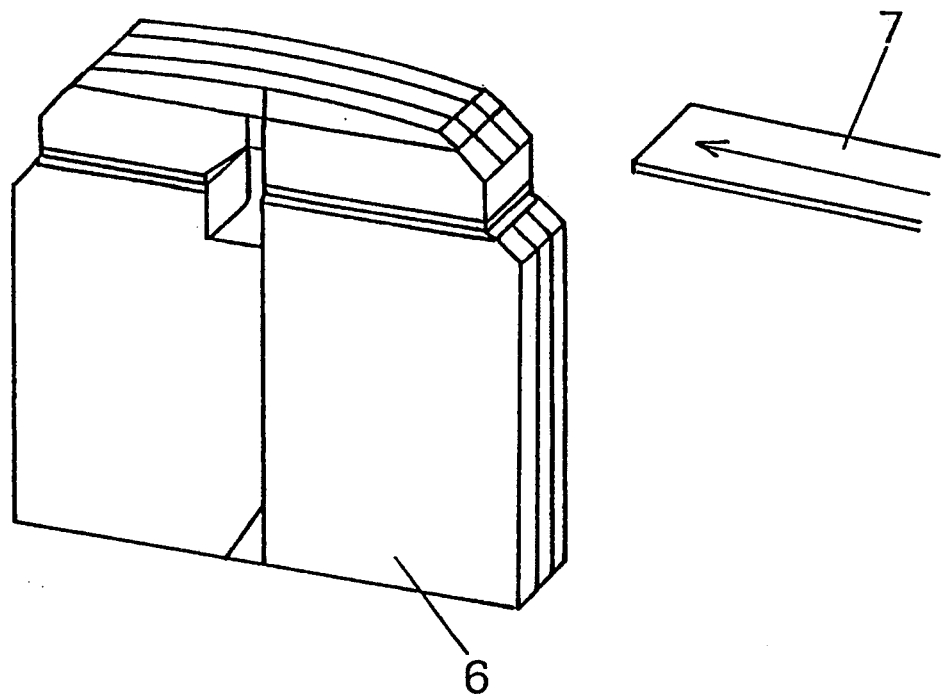
FIG. 6a is a perspective view of the magnetic head of the present invention.
Figure 6B:
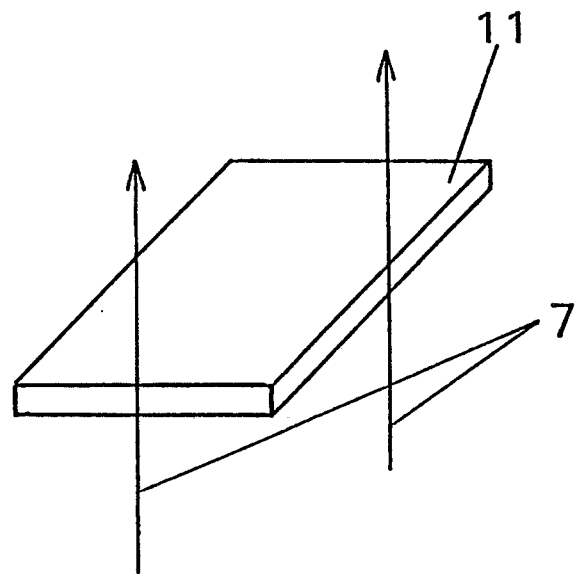
FIG. 6b is an illustration showing the relation between a platelet grain that is contained in the magnetic head and the running direction of magnetic media.

Magnetic materials of the present invention can be used as hard or soft magnetic materials for various applications. For example, magnetic materials formed from magnetic grains containing at least one of the elements of iron and cobalt and having a single magnetic domain structure, with the axes of easy magnetization aligned in a single direction, can be used as permanent magnets. Such magnets exhibit high values of the maximum energy product $(BH)_{max}$ and good electrical insulating properties, and are therefore appropriate for use as magnets for motors or speakers, or for generation of magnetic fields in nuclear magnetic resonance (NMR) imaging, an important analytical technique in medicine. Furthermore, magnetic materials of the present invention are highly suitable for use as magnetic core materials for transformers and magnetic heads. In all such applications, owing to the low eddy current losses mentioned above, these magnetic materials are effective in the high frequency regions. For applications as cores for magnetic heads, the porosity of the magnetic materials should be 0.5% or less, or preferably 0.1% or less. Magnetic heads employing magnetic materials containing platelet grains as magnetic cores, and such that the flat surfaces of the said grains are oriented perpendicularly to the running direction of the magnetic medium, are particularly suitable. For example, the platelet grain 11 shown in FIG. 6b is present in the magnetic material composing the magnetic head 6 shown in FIG. 6a. The relation between the running direction 7 of the magnetic medium and the platelet grain is shown in FIG. 6b. If this type of magnetic head is used, then high output can be obtained in the high frequency regions, particularly in the 40–100 MHz region. Moreover, the magnetic heads of the present invention possess excellent wear resistance.

EXAMPLES

The invention will be further explained by reference to the following examples.

Example 1

A powder consisting of grains made of Fe-2% Si magnetic alloy (first substance), with a mean particle size of 25 μm, was oxidized by heating at 850° C. for three hours, thereby forming an insulating thin coating film composed principally, of silicon oxide (second substance) on the surfaces of alloy grains.

Then, 0.05 wt % of a wax of low temperature volatility, as a binder, was mixed with these coated grains, and this mixture was molded into rectangular parallelopipedal specimens. After removal of the binder, these moldings were loaded into heat-resistant vessels and subjected to hot pressing at a temperature of 750° C. or a pressure of 250 atm for a period of one hour, thereby obtaining a composite sintered body (magnetic material) of the present invention.

The sintered body so obtained possessed the cross-sectional microstructure shown in FIG. 1, with the first substance 1 almost uniformly covered by the second substance 2. This sintered body was of high density, with a porosity of 5% or less. Moreover, detailed examination of the polished surfaces of this sintered body revealed that the proportion of the area occupied by triangular regions (i.e., regions bounded by three or more grains) was 2.5% or less.

The electrical resistance of the composite material so obtained was 20 Mohm or more, and the hardness of this material was 25% higher than that of a sintered body obtained by sintering the same Fe-2% Si alloy without oxidation. Furthermore, in the cutting process with a diamond blade, whereas the machining of conventional magnetic materials requires frequent dressing, machining of the composite sintered body of the present invention required dressing with only about ½ this frequency. Thus, the mechanical workability of this type of magnetic material is greatly improved as compared with conventional types.

Example 2

A composite sintered body was prepared by the same procedure as of Example 1, except that pressure was applied along only a single direction during the hot pressing process.

The sintered body so obtained possessed the cross-sectional microstructure illustrated in FIG. 2, with grains 11 of the first substance, originally almost spherical, deformed into flattened shapes and with the surfaces of these flattened grains covered by the second substance 12. The aspect ratio m of these platelet grains ($m = L/T$, where L denotes the length and T the thickness of the grain) was about 2. This aspect ratio can be varied by appropriately adjusting the pressure and direction of compression when hot pressing is performed, and even grains with an aspect ratio of approximately 10 can be obtained in this manner. Flattening of the grains results in high densely sintered body, improving the porosity from the initial value of 5% to 3%.

This type of sintered body is anisotropic with respect to hardness, wear resistance and magnetic characteristics, the values of all of the aforementioned characteristics being 20–50% higher in the direction perpendicular to the flat surfaces of the grains as compared with directions parallel to these flat surfaces.

When transformers were fabricated with the aforementioned composite material as magnetic cores, the transformers so obtained had excellent magnetic characteristics. Moreover, since the porosity of the composite material was low, the required core volume was decreased and hence losses were reduced.

Example 3

A powder consisting of grains made of Fe-5% Al magnetic alloy (first substance) with a mean particle size of 30 μm, was oxidized by heating at 800° C. for three hours, thereby forming an insulating thin coating film composed principally of aluminum oxide (second substance) on the surfaces of the alloy grains.

Then, 0.05 wt % of a wax of low temperature volatility, as a binder, was mixed with these coated granules, and this mixture was molded into rectangular parallelopipedal specimens. After removal of the binder, these moldings were loaded into heat-resistant vessels and hot-pressed at a temperature of 700° C. under a pressure of 1000 atm for a period of one hour, thereby obtaining a composite sintered body (magnetic material) of the present invention.

The composite sintered body so obtained was of high density, with a porosity of 0.5% or less. Moreover, detailed examination of the polished surfaces of this sintered body revealed that the proportion of the area occupied by triangular regions was 0.3% or less.

The electrical resistance of the composite sintered body so obtained was 20 Mohm or more, and the hardness of this sintered body was 25% higher than that of a sintered body obtained by sintering the same Fe-5% Al alloy without oxidation. When the hot pressing was performed at a temperature of 800° C., the porosity of the sintered body so obtained was 0.1%, and the thickness of the oxide film was approximately 0.2 μm. The saturated magnetic flux density of this composite material was 1500 G or more. Therefore, the aforementioned composite material is applicable for use as magnetic heads for audio equipment.

Example 4

A composite sintered body was prepared by the same procedure as in Example 3, except that pressure was applied along only a single direction during the hot pressing process. In the sintered body so obtained, the grains of the first substance, originally almost spherical, were deformed into flattened shapes (platelet shapes). The aspect ratio of these platelet grains was about 2. This aspect ratio can be varied by appropriately adjusting the pressure and direction of compression when hot pressing is performed, and in fact even grains with an aspect ratio of approximately 10 could be obtained in this manner.

This type of sintered body is anisotropic with respect to hardness, wear resistance and magnetic characteristics, the values of all of the aforementioned characteristics being 20–50% higher in the direction perpendicular to the flat surfaces of the grains as compared with directions parallel to these flat surfaces. When this composite material was used in magnetic heads, magnetic characteristics were also improved as compared with heads fabricated from conventional magnetic materials, for example, the magnetic permeability was approximately 10% higher and the magnetic reluctance approximately 20% lower. Moreover, wear resistance was also approximately 15% higher. In particular, if the flat surfaces of the grains are parallel to the plane of the tape running over the magnetic head, then the magnetic head output in the frequency range of 10–30 MHz is improved by 1–1.5 dB, and demagnetization is reduced. If the flat surfaces of the grains are oriented perpendicularly to the tape, then the magnetic head output in the range of 40–100 MHz is vastly improved. This type of magnetic head is not only suitable for audio equipment but is also particularly appropriate for use in high-definition video tape recorders and computers.

Example 5

A powder consisting of grains made of Si-Al-Ni-Fe (first substance) with composition of Si:Al:Ni:Fe=6:4:3:87 (weight ratio), was prepared by the following procedure. First, the aforementioned components were mixed and melted by high frequency induction heating, the ingots so obtained were crushed with a hammer mill, and grains of #250 mesh or smaller and a mean particle size of approximately 20 μm were classified from the crushed ingot material.

This powder was heated at a temperature of 1200°–1300° C. in an inert gas atmosphere and the grains were flattened by allowing the hot powder to impinge upon a cooling plate at a high velocity.

The shapes of the grains flattened in the aforementioned manner were investigated with a scanning electron microscope or a specific surface measuring device (BET specific surface gauge), etc., and the aspect ratio was determined. These observations revealed that the powder was composed of platelet grains of a diameter of approximately 40 μm and a thickness of 3–4 μm, thus, the aspect ratio of the grains was approximately 10–15.

For purposes of comparison, a powder was prepared from a Si-Al-Fe alloy with composition of Si:Al:-Fe=10:6:84 (weight ratio) and the grains were flattened by the same procedure as that described above. However, even after the aforementioned flattening process, the shapes of the grains in the powder prepared from this alloy were deformed only slightly, and the aspect ratio remained nearly equal to 1. The specific surface of the original grains was 0.04–0.05 $m^2/g$ in each case, and after the flattening process, the specific surface of the grains of the Si-Al-Ni-Fe alloy was approximately 0.1 $m^2/g$, while that of the Si-Al-Fe alloy was approximately 0.2 $m^2/g$. Thus, although not substantially flattened, the specific surface area of the Si-Al-Fe alloy grains was of the same order as that of the grains of Si-Al-Ni-Fe alloy. This is attributed to the fact, verified by scanning electron microscopy, that the powder prepared from the former alloy contained a large number of comparatively small grains, and, moreover, numerous indentations and irregularities were present on the grain surfaces. This was due to the greater hardness and brittleness of the Si-Al-Fe alloy, which caused breakage of grains during the flattening process.

Various methods of flattening other than the impact plate method described above were also examined. The aforementioned two varieties of alloy powder grains were also flattened by using a stamp mill, a ball mill and other devices; however, as in the case where the impact plate was used, the grains of Si-Al-Fe alloy were difficult to flatten, and tended to be deformed from a spherical to a rectangular block shape, or to undergo partial breakage, hence, flattened grains could not be obtained. On the other hand, the Si-Al-Ni-Fe alloy grains were easily flattened in both the stamp mill and the ball mill, thereby obtaining platelet grains with aspect ratios of as much as 10–20.

For purposes of comparison, flattening processes were also applied to iron alloy grains and cobalt alloy grains with other compositions. Excellent flattened granules were prepared from Permalloy (a nickel-iron alloy). However, owing to comparatively low saturated magnetic flux density, i.e., approximately 8000 G, the resulting material was not suitable for magnetic heads. Moreover, since the wear resistance of this alloy is low, such material is susceptible to abrasion caused by sliding friction with magnetic tape, and therefore could not be used as a base material in magnetic heads for high frequency applications. The saturated magnetic flux density of the aforementioned Si-Al-Fe alloy is approximately 10,000 G, while that of the aforementioned Si-Al-Ni-Fe alloy is approximately 15,000 G, and the wear resistance of both alloys is about 2–10 times that of the Permalloy.

Samples of the aforementioned two varieties of alloy powder which had been subjected to the flattening process were heated in an oxidative atmosphere, thereby forming an insulating coating film of a thickness of 10–30 nm on the surface of the grains. Auger electron spectroscopy (AES) revealed that this insulating coating film was principally composed of aluminum oxide (second substance).

Each of these powders with flattened grains having an insulating coating film was then added to ethylene glycol, respectively and a slurry was prepared by thoroughly stirring and mixing. In the above process, approximately 15 ml of ethylene glycol and 25 g of the powder were used. The slurry was then placed in a mold and compressed from above and below under a pressure of approximately 300 kg/$cm^2$. This mold had minute holes in the upper and lower faces so that only the dispersion medium could be expelled, and this compression molding process provided a mold in which the flat surfaces of the platelet grains were oriented perpendicularly to the direction of compression.

For purposes of comparison, another mold was prepared by the same process using Si-Al-Ni-Fe alloy powder with platelet grains but without formation of an insulating coating film.

The aforementioned three varieties of moldings were subjected to hot pressing for 3 hours in an inert gas atmosphere at a temperature in the range of 1200°–1300° C. under a pressure of 30 MPa. The direction of compression in this process was the same as that of the initial molding process.

The sintered bodies so obtained were of high density, with porosity of 1% or less. Examination of cross-sections of these sintered bodies with a scanning electron microscope revealed that the sintered body prepared from the platelet grains of Si-Al-Ni-Fe alloy upon which an oxide insulating layer had been formed possessed a microstructure consisting of magnetic metal grains coated with an aluminum oxide insulating layer of a thickness of 10–30 nm, arranged in the manner of stacked bricks, sintered to a high density, and forming magnetic layers composed of magnetic metal grains of thickness of 3–5 μm. On the other hand, the sintered body prepared from the grains of Si-Al-Fe alloy which had undergone oxidation treatment after the flattening process possessed a microstructure characterized by sporadic severing of the oxide insulating film with mutual interpenetration of metal grains and the insulating film. Finally, the sintered body prepared from the platelet grains of Si-Al-Ni-Fe alloy upon which no oxide insulating coating film had been formed displayed a microstructure characterized by oriented plate-shaped metal grains.

The electrical resistances of the sintered bodies obtained in the aforementioned manner were measured. A bar cut from the sintered body (thickness of approximately 5 mm, length of approximately 30 mm) prepared from the platelet grains of Si-Al-Ni-Fe alloy of upon which an oxide insulating layer had been formed exhibited a high resistance of approximately 1 Mohm in directions both perpendicular and parallel to the flat faces of the grains. The electrical resistance of the insulating layer itself was in the order of several tens of megohms. However, for the other two varieties of sintered bodies, the electrical resistances were no greater than the order of several hundred microhms, or the same order as that of ordinary magnetic metals.

Also, the magnetic characteristics of these sintered bodies were measured. For the sintered body prepared from the platelet grains of Si-Al-Ni-Fe alloy upon which an oxide insulating layer had been formed, the magnetic permeability in the frequency range of 10 kHz–5 MHz was approximately 100–300 in the direction perpendicular to the flat surfaces of the grains and 1000–1500 in directions parallel to the flat surfaces; the saturated magnetic flux density of the sintered body was 15,000 G, i.e., of the same order as that of the magnetic metal used as original raw material. However, the other two varieties of sintered bodies exhibited magnetic permeabilities of several hundred to 1,000 G in the low frequency region from 10 Hz to 1 kHz, whereas at frequencies beyond 1 kHz the magnetic permeabilities of these sintered bodies dropped to the order of several tens or less.

Example 6

Two varieties of alloy powder A and B were prepared as follows using the same Si-Al-Ni-Fe alloy as used in Example 5. First, ingots prepared in the same manner as in Example 5 were cut into blocks of appropriate size, then these blocks were melted by high frequency induction heating, and so-called nitrogen-atomized globular powder was prepared by using high-pressure argon gas to blow the molten alloy into a nitrogen gas atmosphere. This nitrogen-atomized globular powder was classified, the fine powder of mesh #250 or less was collected, and this was designated as alloy powder A. The other variety of powder was prepared by rough crushing of blocks from the same type of ingot in a hammer mill, followed by fine pulverization of this material in a jet mill, using nitrogen as the carrier gas, after which the powder so obtained was classified and the fine powder of mesh #250 or less was collected; this variety was designated as alloy powder B.

Measurements revealed no differences in the specific surface areas of alloy powders A and B, both being in the range 0.05–0.06 m$^2$/g. However, scanning electron microscopy revealed that alloy powder A was composed of globular grains of fairly uniform size, with a mean grain diameter of approximately 15–16 μm; on the other hand, alloy powder B was composed of block-shaped grains of irregularly assorted forms with various grain sizes, ranging from fine to coarse grains.

Next, alloy powders A and B were separately subjected to flattening treatment in a ball mill for 50 hours. The shape, aspect ratio and other features of the platelet powder grains so obtained were evaluated by means of a scanning electron microscope and a specific surface area measuring device. The results revealed that the platelet granular powder prepared by using alloy powder A was composed almost entirely of oblong disks approximately 3–5 μm in thickness, and approximately 30 μm in long axis (major axis); the distribution of grain diameters was narrow, extending over a range of 20–40 μm, and the aspect ratio was approximately 10. The platelet granular powder prepared by using alloy powder B was also composed of oval grains with flat surfaces, but the size of of these granules was very irregular, the diameters being distributed over the wide range of 3–60 μm and the thicknesses ranging from 0.5 to 20 μm, while the surfaces of the granules was irregular.

Next, respective samples of the aforementioned two varieties of platelet granular powder were subjected to oxidation treatment by heating in air at 400° C. for 10 minutes, thereby forming insulating layers of thickness 20–50 nm on the surfaces of the platelet grains.

The powders so obtained were then subjected to wet molding by the same method as in Example 5, thereby orienting the platelet grains, and the molded samples so obtained were placed in a hot-pressing mold and hot-pressed for three hours at 1200°–1300° C. under a pressure of 300 kg/cm$^2$, thus obtaining two varieties of composite sintered bodies.

Both varieties of sintered bodies obtained in this manner were of high density, with porosity of 1% or less. Measurements of electrical characteristics showed that the sintered bodies (thickness approximately 5 mm, diameter 30 mm) prepared from the alloy powder A possessed high electrical resistance, exceeding 20 Mohm, while the electrical resistance of sintered bodies of the same shape prepared from the alloy powder B were 1–2 Mohm. This disparity is attributed to the presence of numerous irregular indentations on the surface of the platelet grains, which renders the thin insulating film more susceptible to breakage when the high-densely sintered bodies are formed. When such composites are used in devices such as magnetic heads, high resistance is desirable in order to reduce eddy current losses, and therefore the composite prepared by using alloy powder A is appropriate for such applications. However, the composite prepared by using alloy powder B is also suitable for applications where particularly high electrical resistance is not required.

Using the above-mentioned composite sintered body prepared from the platelet grains originated from alloy powder A, a magnetic head for video use, with track width 30 μm and magnetic gap 0.3 μm, was fabricated so that the running direction of the magnetic tape was parallel with the flat surfaces of the grains in the powder. For comparison, samples of alloy powder B was sintered by hot pressing without prior oxidation, thereby preparing a magnetic material of the conventional type, and this was used to fabricate a magnetic head of the same form as stated above.

The performance of these magnetic heads was evaluated using magnetic tape fabricated with $\gamma$-Fe$_2$O$_3$ as magnetic powder (with a coercive force Hc of approximately 500 Oe). At the frequency 5 MHz, the output of the magnetic head prepared from platelet grains originated from alloy powder A was 5–10 dB higher than that of the magnetic head prepared from alloy powder B without oxidation treatment.

For further comparison, a magnetic powder with globular grains bearing insulating films was prepared from a globular powder with the same composition as alloy powder A and a grain size of about 20 μm by surface oxidation treatment. Then, sintered compacts were obtained from this powder in the same manner as described above. Then, magnetic heads of the above-described form were fabricated from these sintered bodies, and the performance characteristics of these heads were evaluated. The results showed that this magnetic head provided 3–5 dB higher output at the same frequency as compared with the magnetic heads prepared from the above-mentioned alloy powder B without oxidation treatment, but exhibited lower output than the magnetic heads fabricated with the platelet grain powder obtained from alloy powder A.

Example 7

A silicon-aluminum-iron-cobalt alloy (first substance), with composition Si:Al:Fe:Co=9.5:6:84:0.5 (weight ratio) in the form of a platelet grain powder (aspect ratio 3–10, thickness 3 μm) was heat-treated at 800° C. for one hour in argon gas containing 0.05% oxygen gas, thereby effecting extremely shallow oxidation of the grain surfaces. The thickness of the oxide film so formed was estimated to be approximately 10–20 nm on the basis of calculations from the weight increase and specific surface area of the powder as well as Auger electron spectroscopy.

Figure 7:
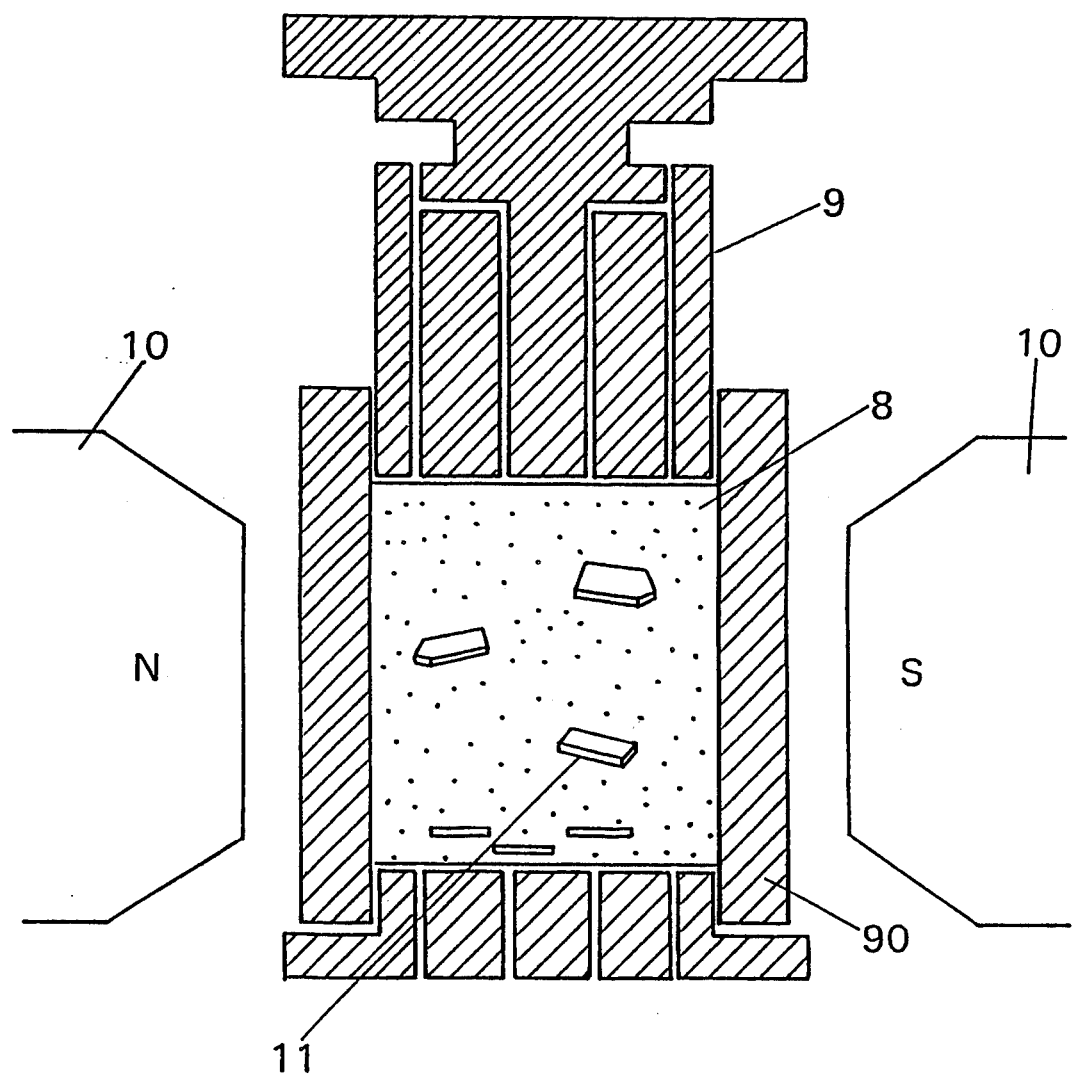
FIG. 7 is an illustration of a wet magnetic pressing apparatus in magnetic field used for the preparation of the magnetic material showing in FIG. 3.

The aforementioned powder with grains covered by an oxide film was added to a glycerin solution and stirred into a slurry. Then, rectangular parallelopipedal moldings were obtained from this slurry using the wet magnetic pressing apparatus schematically illustrated in FIG. 7. That is, the slurry containing the platelet granular powder 11 was poured into the space between a pair of wet molds 9, 90 and a pressure of 1000 kg/cm² was applied from above and below, expelling only the solvent 8 of the slurry from the minute holes of the molds, and a magnetic field of 10,000 Oe, perpendicular to the direction of compression, was simultaneously applied with a magnet 10.

Owing to the aforementioned wet uniaxial compression process, the resulting molding has the form shown in FIG. 3, wherein the flat surfaces of the flattened grains 21 are oriented perpendicularly to the direction of compression, while owing to the impressed magnetic field, the direction of the axes of easy magnetization 4 are aligned with the direction of the impressed magnetic field 5.

These moldings were then hot-pressed at a temperature of 850° C. and a pressure of 500 kg/cm² for four hours in a nitrogen atmosphere containing 1% oxygen gas, applying pressure along the same direction as that of the aforementioned compression molding process, and thereby obtaining composite sintered bodies.

After polishing the surfaces of the composite material obtained in this manner, the sintered density and porosity of the material were measured. The results showed that the relative density of these sintered bodies was 99.5% or more, and the porosity was 0.5%. The electrical resistance of this composite material was 20 Mohm or more, and the saturated magnetic flux density was 10,000 G or more.

Figure 8:
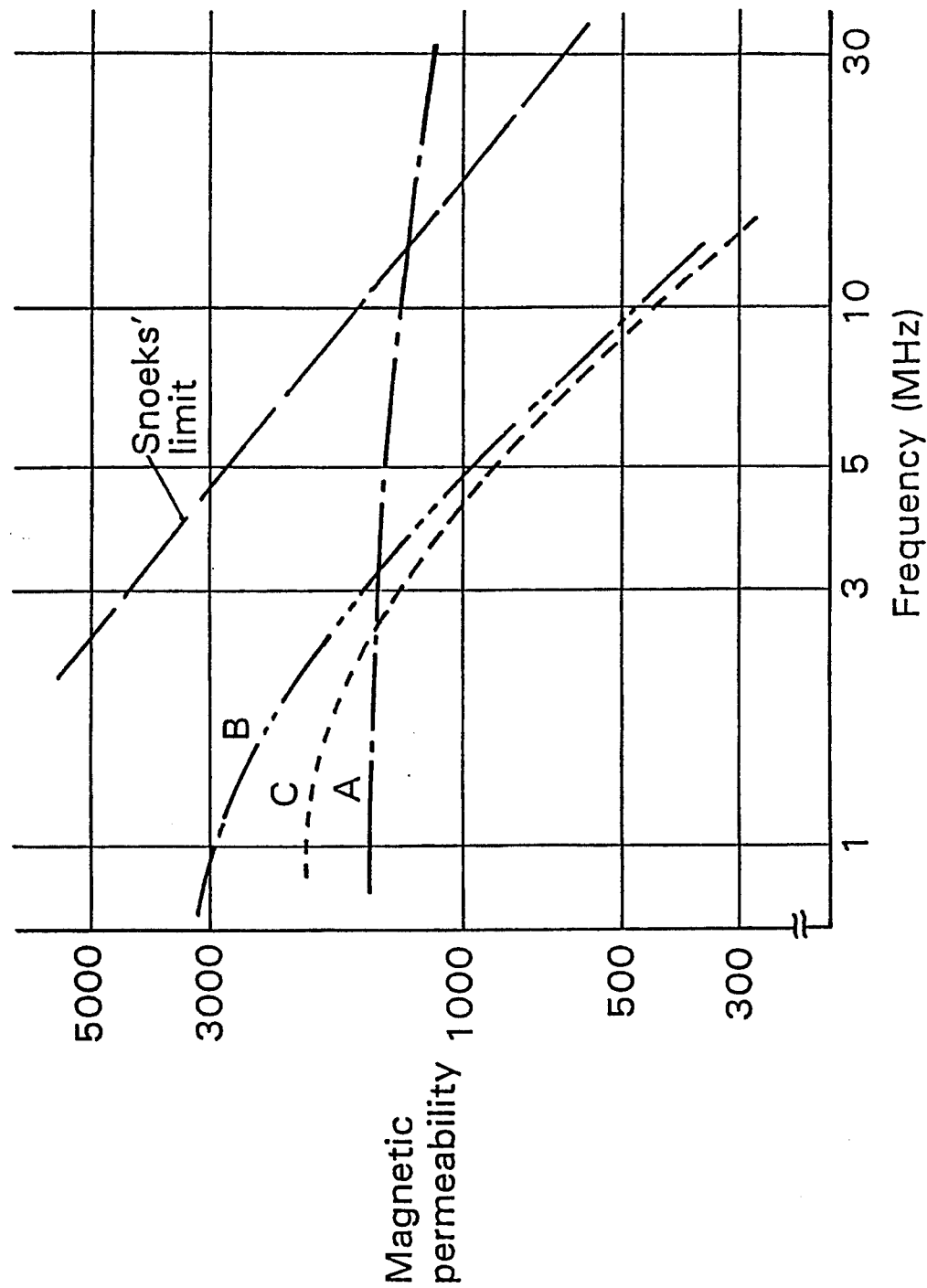
FIG. 8 is a graph showing the characteristics of the magnetic material of the present invention.
Figure 9:
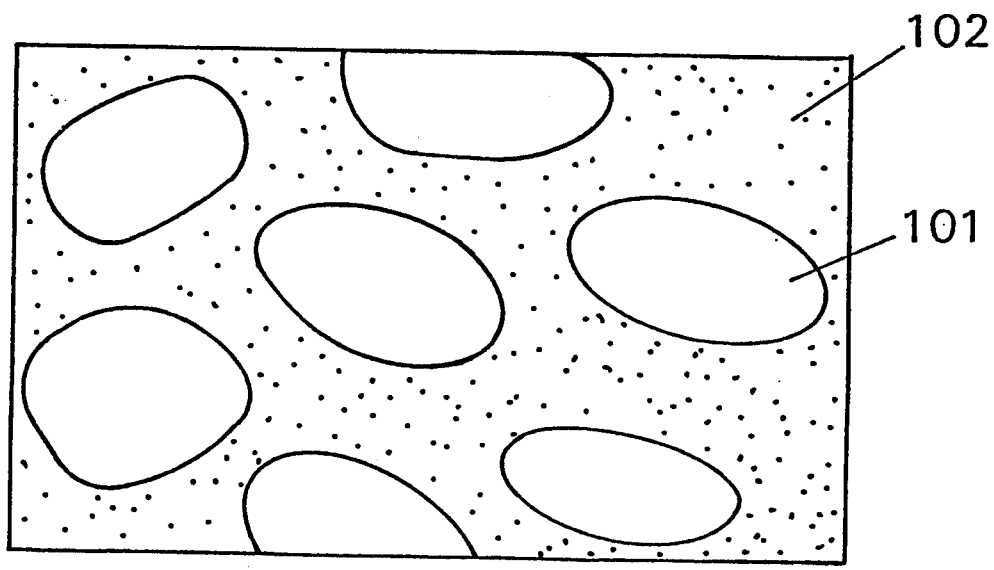
FIG. 9 is an enlarged sectional view of the conventional magnetic materials.

Also, the magnetic permeability of this composite material was measured, i.e., the magnetic permeabilities in directions parallel and perpendicular to the flat surfaces of the powder grains were measured separately, with the results shown in FIG. 8. The magnetic permeability B in the direction parallel to the flat surfaces of the powder granules, i.e., the direction of the axes of easy magnetization 4, was of the order of 500 at the frequency of 10 MHz and 200-300 at 20 MHz. On the other hand, the magnetic permeability A in the direction perpendicular to the flat surfaces of the powder grains was 1300 at 10 MHz and 1200 at 20 MHz. Thus, magnetic permeabilities well above 1000 were obtained throughout this frequency range.

Magnetic heads for video devices, with track width of 15 μm and magnetic gap of 0.2 μm, were fabricated using the aforementioned composite material as magnetic cores. Three varieties of such magnetic heads were fabricated, i.e., one variety with the running direction of the magnetic tape parallel to the flat surfaces of the powder grains designated as magnetic head A, a second variety with the running direction of the magnetic tape perpendicular to the flat surfaces of the powder grains, designated as magnetic head B, and a third variety with the running direction of the magnetic tape inclined at an angle of nearly 45° to the flat surfaces of the powder grains, designated as magnetic head C.

The performance of these magnetic heads was evaluated using magnetic tape fabricated with γ-Fe₂O₃ as magnetic powder (coercive force Hc from 1,000 to 1,500 Oe) in the frequency range of 5-10 MHz. The results showed that the S/N ratio of magnetic head B, with the running direction of the magnetic tape perpendicular to the flat faces of the powder granules, was approximately 3-5 dB higher than that of the magnetic heads A and C.

For purposes of comparison, the recording and reproduction performance of a conventional magnetic head for video use, fabricated from monocrystalline manganese-zinc ferrite, was also assessed, and the results demonstrated that the S/N ratio of this head was approximately 5-7 dB lower than that of the aforementioned magnetic head B.

Example 8

A silicon-aluminum-iron alloy (first substance), with composition Si:Al:Fe=10:6:84 (weight ratio) in the form of a globular powder (mesh #250 or less, mean grain size 30 μm) was mixed with an organic binder and blended into a slurry. Then, using the doctor blade method sheets 40 μm in thickness were prepared from this slurry. After drying, these sheets were heated in a non-oxidizing atmosphere at a temperature in the range of 500°-600° C., thereby effecting thermal decomposition of the binder and removing the said binder from the sheets. Each of these sheets was composed of a dense one-granule layer of globular alloy grains.

A 30 nm-thick film of silicon dioxide (the second substance) was formed on the surfaces of these sheets by sputtering. Then, above each of these silicon-dioxide coated alloy powder layers, another layer of alloy powder was formed by the aforementioned procedure, and after removal of the binder still another silicon dioxide film was deposited on this sandwich.

This process was performed three times, thereby creating laminates of magnetic metal powder and an insulator, made of silicon dioxide. Next, these laminates were hot-pressed for two hours at 1000° C. in a non-oxidizing atmosphere, using a pressure of 100 kg/cm² applied in the direction perpendicular to the sheet surfaces, and thereby obtaining high-density composite sintered bodies.

The porosity of these sintered bodies was 1% or less. Examination of cross-sections of these sintered bodies with a scanning electron microscope revealed a microstructure of the form shown in FIG. 4, wherein layers 301 of thickness 25-30 μm, composed of magnetic, metal grains 31 sintered to a high density, alternated with insulating layers 32 of thickness 20 nm, composed of silicon dioxide.

The electrical resistance of these composites in the direction perpendicular to the magnetic layers was 1 Mohm, a large value comparable with that of ordinary insulators. On the other hand, the electrical resistance in directions parallel to the magnetic layers was several tens of microhms (i.e., of the order of the electrical resistance values exhibited by ordinary metals) along the magnetic layers, and several tens of megohms along the insulating layers.

The magnetic characteristics of these composites were measured. The magnetic permeability at the frequency of 10 kHz was 50 in the direction perpendicular to the magnetic metal layers, and 1500 in directions parallel to the magnetic metal layers. The saturated magnetic flux density of these composites was 11,000 G, nearly the same as that of the magnetic metal which constituted the original powdered raw material.

Example 9

A film of silicon dioxide (the second substance) was deposited by sputtering onto the surfaces of the constituent needle granules (long axis 0.1 μm, short axis 0.05 μm) of an acicular powder composed of an iron-cobalt alloy Fe:Co=6:4 (atomic ratio). The thickness of the silicon dioxide film was 5-20 nm.

The aforementioned coated powder was added to a glycerin solution, and the mixture was stirred into a slurry. Then, rectangular parallelopipedal specimens were molded from this slurry using the same wet magnetic pressing apparatus as was used in Example 7. The wet magnetic pressing process oriented the long axes of the needle granules of the acicular powder along the direction of the applied magnetic field, thus, molded compacts with a desired orientation were obtained.

These moldings were then hot-pressed in a nitrogen atmosphere at 600°–800° C. for four hours, with pressure being applied (500 kg/cm$^2$) along the same direction as in the initial molding process, thereby obtaining composite permanent magnets ( designated as composite A).

For purposes of comparison, a globular powder with mean grain size of 0.2 μm composed of an iron-cobalt alloy [Fe:Co=6:4 (atomic ratio)] was used as the first substance, and composite permanent magnets (designated as composite B) were prepared by the same process as described above. In this case, since the globular granules were used, the granules in the mold obtained by the wet magnetic pressing apparatus were not oriented.

The magnetic characteristics of two varieties of composites obtained in the aforementioned manner were measured. The maximum energy product (BH)max of composite A was 50–60 MGOe; this value is even greater than the previously reported values of (BH)max for sintered Nd-Fe-B magnets (approximately 40 MGOe). The value of (BH)max for composite B was 6.5 MGOe.

This composite A exhibited not only a large value of (BH)max but also high electrical resistivities of the order of 10$^8$ to 10$^9$ ohm-cm, of the same magnitude as ordinary insulators.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A magnetic sintered composite material comprising:
    a discrete phase including grains made of a first substance which comprises a magnetic metal or alloy thereof; and
    a continuous phase consisting essentially of a dielectric thin coating film of an oxide or nitride of a metal or alloy, said thin coating film being formed on the surface of said grains and having a mean thickness smaller than the mean particle size of said grains, wherein said grains are separated substantially from each other by said thin coating film, said magnetic sintered composite material having an electrical resistivity on the order of at least 10$^6$ times that of said magnetic metal or alloy thereof, said first substance being an alloy selected from the group consisting of an iron-aluminum, an iron-silicon, an iron-nickel, an iron-nickel-molybdenum, and an iron-silicon-aluminum-cobalt.

2. A magnetic sintered composite material according to claim 1, wherein said first substance contains an alloy selected from the group consisting of an iron-aluminum, an iron-silicon, an iron-nickel, an iron-nickel-molybdenum, and an iron-silicon-aluminum-cobalt, said grains made of the first substance have a mean particle size ensuring the formation of a single magnetic domain structure, and the axes of easy magnetization of said grains coincide with each other.

3. A magnetic sintered composite material according to claim 1, wherein said thin coating film is formed from a member of the group consisting of aluminum oxide, aluminum nitride, magnesium oxide, manganese-zinc ferrites and nickel-zinc ferrites.

4. A magnetic sintered composite material according to claim 1, having a porosity of 5% or less.

5. A magnetic sintered composite material according to claim 4, having a porosity of 0.5% or less.

6. A magnetic sintered composite material according to claim 1, wherein said grains made of the first substance have a platelet shape.

7. A magnetic sintered composite material according to claim 1, wherein said grains made of the first substance have a needlelike shape.

8. A magnetic sintered composite material according to claim 6, having a porosity of 0.1% or less.

9. A magnetic sintered composite material according to claim 6, having a microstructure in which said grains made of the first substance are oriented.

10. A magnetic sintered composite material according to claim 6, wherein said platelet grains have an axis of easy magnetization along their major axes.

11. A magnetic head comprising a magnetic core which is made of a magnetic sintered composite material of claim 6, wherein said grains oriented in the magnetic core have their flat surface perpendicular to a running direction of magnetic media.

12. A magnetic head according to claim 11, wherein said platelet grains have an axis of easy magnetization along their major axes.

13. A magnetic sintered composite material according to claim 1, wherein said magnetic material is formed as a magnetic head.

14. A magnetic sintered composite material according to claim 1, wherein said magnetic material is formed as a core of a magnetic transformer.

15. A magnetic sintered composite material according to claim 1, wherein said magnetic material is formed as a hard magnet.

* * * * *